No. 738,981. PATENTED SEPT. 15, 1903.
A. BUNTENBACH.
FOOD CONTAINER.
APPLICATION FILED JUNE 2, 1903.
NO MODEL.

Witnesses:-
F. C. Fliedner

Inventor,
August Buntenbach
By Geo. H. Strong.
Atty.

No. 738,981. Patented September 15, 1903.

UNITED STATES PATENT OFFICE.

AUGUST BUNTENBACH, OF LONDON, OREGON.

FOOD-CONTAINER.

SPECIFICATION forming part of Letters Patent No. 738,981, dated September 15, 1903.

Application filed June 2, 1903. Serial No. 159,732. (No model.)

*To all whom it may concern:*

Be it known that I, AUGUST BUNTENBACH, a citizen of the United States, residing at London, county of Lane, State of Oregon, have invented an Improvement in Food-Containers; and I hereby declare the following to be a full, clear, and exact description of the same.

My invention relates to improvements in containers, and has reference particularly to those for sausages. Its primary object is to provide a simple and attractive substitute for the gut which constitutes the ordinary sausage-casing.

It consists of the parts and the construction and combination of parts hereinafter more fully described, having reference to the accompanying drawings, in which—

Figure 1:
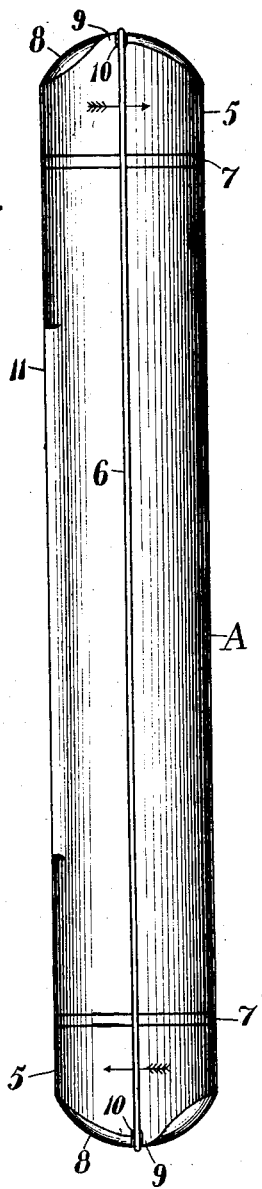
Figure 2:
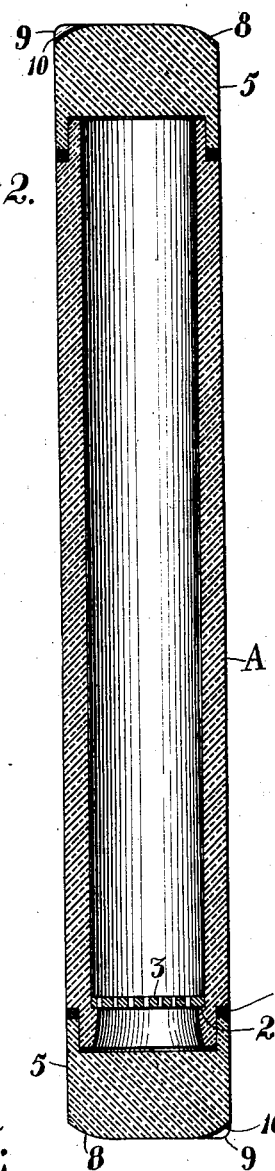
Figure 3:
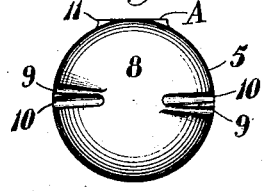

Figure 1 is an elevation of my device. Fig. 2 is a longitudinal central section. Fig. 3 is an end view of my device.

In the preparation of Bologna sausages it is usual to fill the gut-casings and after tying the ends to hang the sausages in the "smoke-house" till cured. The general appearance of the marketable product is well known. The prejudice of many people to sausages as a food arises from the nature of the containing medium.

I purpose taking a tubular section, as A, of glass or other suitable material slightly reduced on its interior diameter adjacent one end to form a ledge, as 2, to afford a seat for a removable perforated bottom 3 and filling the tube with sausage-meat. The filling may be done by any suitable means assisted by a plunger to cause the meat to be sufficiently compacted, the air being given opportunity to escape through the perforated bottom 3. The filled open-ended tube is then hung in the smoke-house and left there until the contents are cured, the contents shrinking somewhat from the sides of the tube during drying and circulation of smoke taking place through the perforations in bottom 3 and around the inside of the tube. The tube is ultimately closed and rendered air-tight by means of the closures or caps 5 and a rectangular locking-bail 6, the caps fitting loose over each end of the tube and seating on rubber washers 7. Each cap is more or less wedge-shaped at the end, with the inclines of the wedge convexed, as at 8, and the corners of the wedge forming diametrically-opposed shoulders or abutments 9. On one side of each abutment the surface 8 is flattened and a shallow radial groove 10 made, the two grooves on each cap being in line and disposed diagonally to the line connecting the abutments. The bail 6 is of flexible non-stretching material, preferably wire, and is of such length that one end of the bail may be engaged in the grooves 10 in one of the caps after the caps have been placed over the tube and one corner of the other end of the bail engaged in one of the corresponding grooves behind its abutment. With the grooves 10 in both caps in the same plane it is then possible to slip the other corner of the bail into the remaining groove. The caps or closures are tightened by simply turning them by hand in opposite directions, as indicated by the arrows, to throw the grooves in one closure out of plane with those in the other, which causes the bail to be twisted around the outside of the case, drawing the closures together against their respective seats, according as the tension on the bail is increased. The caps are so turned that the wire pulls against each abutment or stop 9, and thus there is avoided any possibility of the bail slipping from the grooves. The case or tube is opened at any time by turning the caps in the opposite direction to bring the two planes of the bail parallel with the axis of the tube, allowing the bail then to be disengaged by the fingers from one or the other of the closures.

By making the two closures symmetrical and interchangeable it enables either closure or either corner of either closure to be engaged first or last by the bail.

While this device has been described in conjunction with a particular art, it is obvious that it is adapted for the reception and preservation of a great variety of foods and other products.

To prevent the tubes rolling when laid upon a shelf or other surface, the exterior of the tube may be provided with flattened protuberances 11 to provide a seat or base upon which the tube may normally rest.

Having thus described my invention, what I claim, and desire to secure by Letters Patent, is—

1. A container consisting of a tubular section, a removable closure loosely fitting each end thereof, and turnable relatively one to the other, and a non-stretching flexible locking-bail engaging said closures and adapted to be twisted about the outside of the case to firmly seat the closures.

2. A container consisting of a tubular section open at the ends and having an internal ledge or shoulder on its inside near one end, a removable perforated bottom part seating on said ledge or shoulder, and closures for said tube.

3. A container consisting of a tube open at the ends, and provided on its inside with a ledge or shoulder, a removable perforated bottom part seating on said ledge or shoulder, closures for the tube and locking means external to the tube for said closures.

4. A container consisting of a tube open at the ends, and provided on its inside with a ledge or shoulder, removable closures for each end, a removable bottom seating on said ledge, said closures having radial grooves and turnable relative to one another, and means external to the tube to engage said closures and draw them together.

5. The combination of a containing part, a turnable closure therefor, a flexible non-stretching loop embracing said closure, the planes of said loop normally lying parallel with the axis of the said containing part but adapted to be carried out of plane therewith when the closure is turned, to tighten the latter.

6. A container comprising a tube, a closure fitting loosely over an end thereof, said closure having opposed inclined external surfaces whose meeting edges are approximately on the line of a diameter of said closure, said closure having radial grooves approximately coincident with said line of juncture, and locking means engaging said grooves.

7. The combination of a tubular containing part, a closure therefor and locking means, said closure having oppositely-inclined convexed surfaces whose meeting edges are approximately on the line of a diameter of said closure, said closure having shallow radial grooves approximately coincident with said line of juncture, and an abutment adjacent to each groove, the line connecting said abutments intersecting the line of said grooves.

In witness whereof I have hereunto set my hand.

AUGUST BUNTENBACH.

Witnesses:
S. H. NOURSE,
JESSIE C. BRODIE.